(12) United States Patent
Lampacrescia et al.

(10) Patent No.: US 12,704,844 B2
(45) Date of Patent: Aug. 11, 2026

(54) METHOD FOR ADDING ONE OR MORE ANCHOR POINTS TO A MAP OF AN ENVIRONMENT

(71) Applicant: Robert Bosch GmbH, Stuttgart (DE)

(72) Inventors: Marco Lampacrescia, Stuttgart (DE); Gerhard Kurz, Karlsruhe (DE); Matthias Holoch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 268 days.

(21) Appl. No.: 18/354,326

(22) Filed: Jul. 18, 2023

(65) Prior Publication Data

US 2024/0036586 A1 Feb. 1, 2024

(30) Foreign Application Priority Data

Jul. 29, 2022 (DE) ..................... 10 2022 207 829.2

(51) Int. Cl.
*G05D 1/00* (2024.01)

(52) U.S. Cl.
CPC ......... *G05D 1/0274* (2013.01); *G05D 1/0212* (2013.01)

(58) Field of Classification Search
CPC ............... G05D 1/0274; G05D 1/0212; G05D 2111/17; G05D 1/2295; G05D 1/242; G05D 1/2462; G05D 2109/10; G01C 21/206; G01C 21/383; G01C 21/3804; G06T 11/60
See application file for complete search history.

(56) References Cited

U.S. PATENT DOCUMENTS 8,775,070 B1 * 7/2014 Bhatia ................ G01C 21/3469 701/425
10,030,980 B2 * 7/2018 Nowak .................. G01C 21/26
10,605,611 B2 * 3/2020 Park ................... G01C 21/3694
(Continued)

FOREIGN PATENT DOCUMENTS

DE 102019123538 A1 3/2021
DE 102021005084 A1 1/2022
(Continued)

OTHER PUBLICATIONS

Grisetti et al., "A Tutorial on Graph-Based Slam," IEEE Intelligent Transportation Systems Magazine, vol. 2. No. 4, 2010, pp. 1-11. <http://www2.informatik.uni-freiburg.de/~stachnis/pdf/grisetti10titsmag.pdf> Downloaded Jul. 18, 2023.

*Primary Examiner* — Redhwan K Mawari
(74) *Attorney, Agent, or Firm* — NORTON ROSE FULBRIGHT US LLP

(57) ABSTRACT

A method for adding one or more anchor points to a map of an environment, wherein a description has been or is in particular associated with the one or more anchor points. The map is based on a SLAM graph. The map is in particular used to navigate a mobile device in the environment. The method includes, for each of the one or more anchor points: providing a position and/or orientation of the anchor point; associating the anchor point with a node in the SLAM graph, in particular a node nearest the anchor point; creating a link between the anchor point and the node; and adding the anchor point to the map of the environment.

14 Claims, 4 Drawing Sheets

(56) References Cited

U.S. PATENT DOCUMENTS

| | | | | |
|---|---|---|---|---|
| 2016/0189544 | A1* | 6/2016 | Ricci | G08G 1/096725 701/117 |
| 2016/0258775 | A1* | 9/2016 | Santilli | G06Q 10/0833 |
| 2017/0369059 | A1* | 12/2017 | Schuberth | B60W 30/143 |
| 2018/0094934 | A1* | 4/2018 | Rivers | G05D 1/0206 |
| 2018/0161986 | A1 | 6/2018 | Kee et al. | |
| 2018/0315211 | A1* | 11/2018 | Chen | G06V 10/757 |
| 2018/0340789 | A1* | 11/2018 | Bader | G01C 21/3415 |
| 2020/0182629 | A1* | 6/2020 | Alawieh | H04W 4/46 |
| 2022/0236073 | A1* | 7/2022 | Homann | G01C 21/32 |
| 2022/0291692 | A1* | 9/2022 | Drinkard | G05D 1/6987 |
| 2023/0190064 | A1* | 6/2023 | Haug | A47L 11/4011 15/319 |

FOREIGN PATENT DOCUMENTS

| | | | |
|---|---|---|---|
| DE | 102020128391 | A1 | 4/2022 |
| WO | 2020016385 | A1 | 1/2020 |

* cited by examiner 108
250
252
140
210
220
SLAM module
sensor module
anchor module
264
222
software module
map processing module
240
270
272
260
230
262
282
280

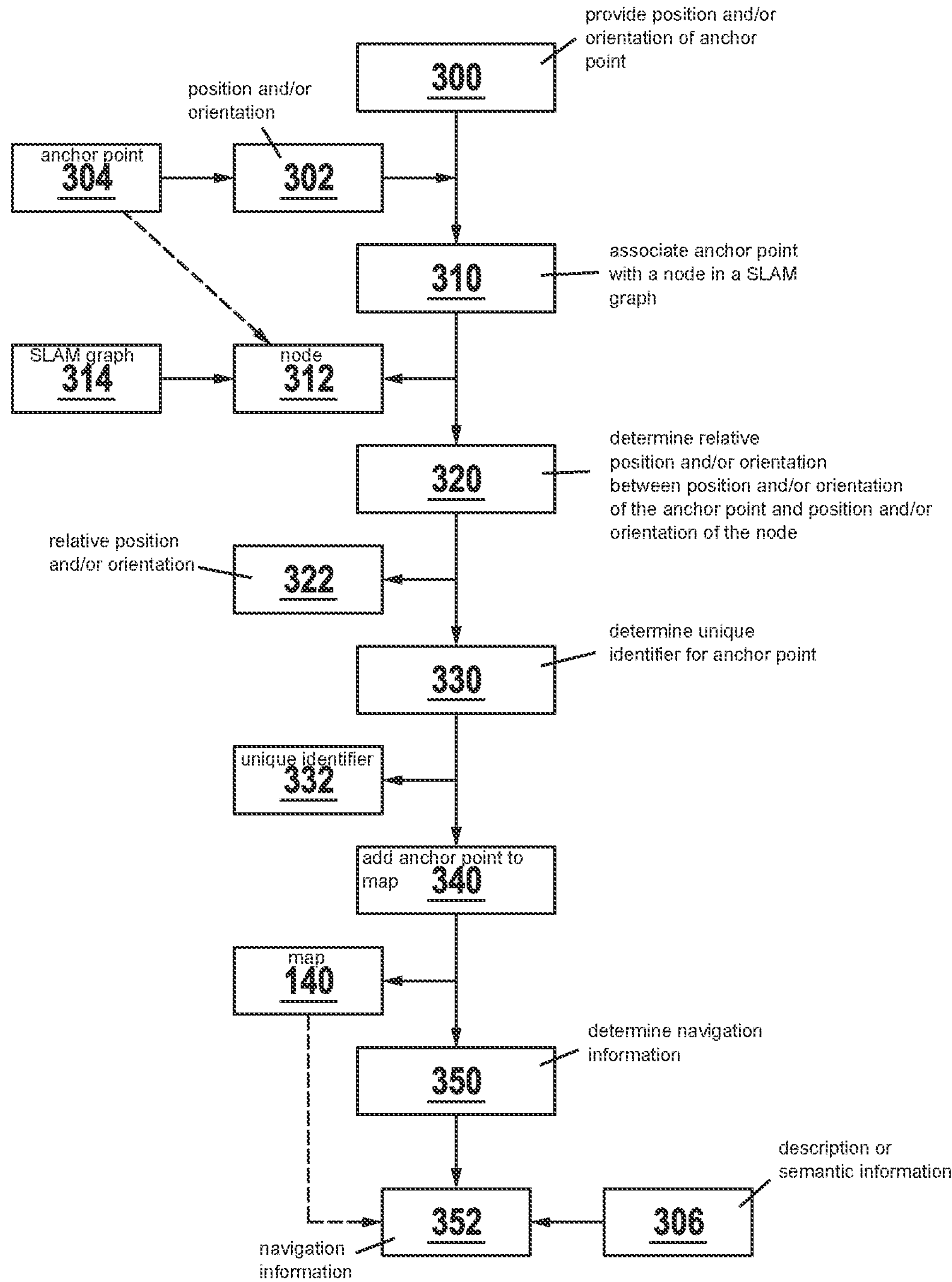
Fig. 3
provide position and/or orientation of anchor point
300
position and/or orientation
anchor point
304
302
associate anchor point with a node in a SLAM graph
310
SLAM graph
314
node
312
determine relative position and/or orientation between position and/or orientation of the anchor point and position and/or orientation of the node
320
relative position and/or orientation
322
determine unique identifier for anchor point
330
unique identifier
332
add anchor point to map
340
map
140
determine navigation information
350
description or semantic information
352
306
navigation information Fig. 5
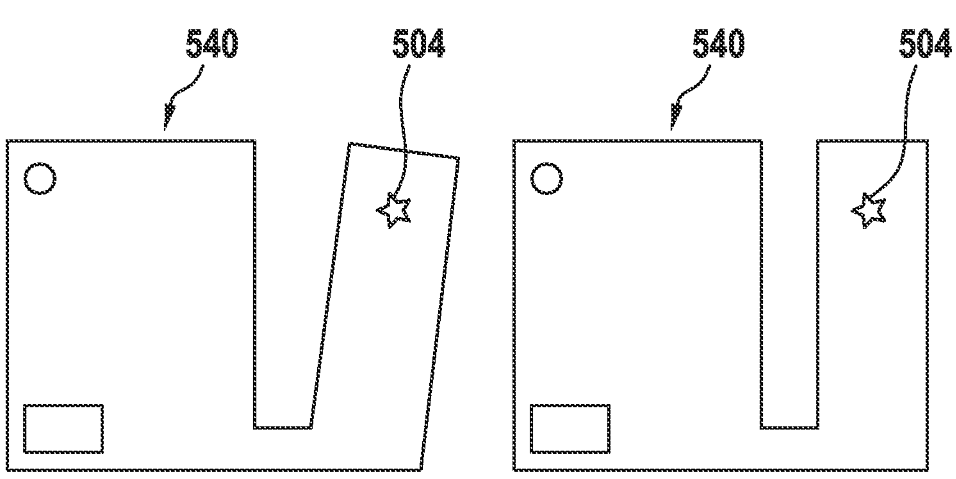
Fig. 6
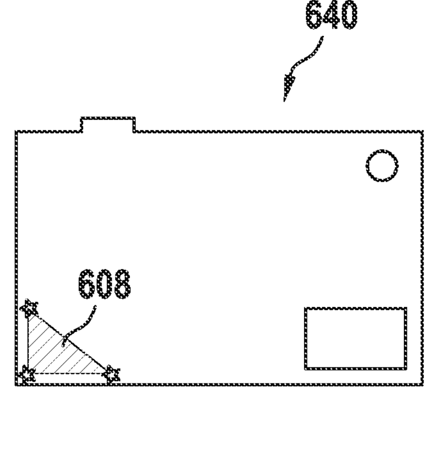
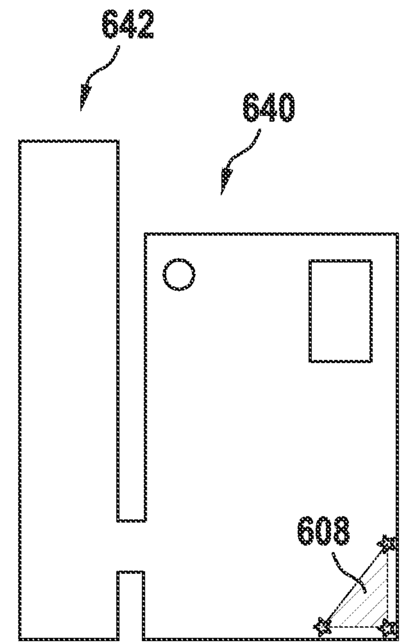

METHOD FOR ADDING ONE OR MORE ANCHOR POINTS TO A MAP OF AN ENVIRONMENT

CROSS REFERENCE

The present application claims the benefit under 35 U.S.C. § 119 of German Patent Application No. DE 10 2022 207 829.2 filed on Jul. 29, 2022, which is expressly incorporated herein by reference in its entirety.

FIELD

The present invention relates to a method for adding one or more anchor points to a map of an environment, wherein the map is based on a SLAM graph, and wherein the one or more anchor points in particular has been or is associated with a description, and to a system for data processing, a mobile device, and a computer program for carrying out the same.

BACKGROUND INFORMATION

Mobile devices, such as vehicles or robots moving in an at least partially automated manner, typically move in an environment, in particular in an environment to be processed or in a work area, such as an apartment, in a garden, in a factory hall, or on the road, in air or in water. One of the basic problems of such or also other mobile devices is orienting, i.e., knowing what the environment looks like, i.e., in particular where obstacles or other objects are, and where (in absolute terms) the mobile device is. For this purpose, the mobile device can, for example, be equipped with various sensors, such as cameras, lidar sensors or inertial sensors, with the help of which the environment and the movement of the mobile device are, for example, sensed two- or three-dimensionally. This allows the mobile device to move locally, to recognize obstacles in a timely manner and to drive around them.

SLAM ("Simultaneous Localization and Mapping") refers to a method in robotics in which a mobile device, such as a robot, can or must simultaneously create a map of its environment and estimate its spatial location within this map. It is thus used to recognize obstacles and thus supports autonomous navigation. SLAM does not generally require an absolute position, such as from a GPS sensor.

SUMMARY

According to the present invention, a method for adding one or more anchor points to a map of an environment as well as a system for data processing, a mobile device and a computer program for performing said method, are provided. Advantageous example embodiments of the present invention are disclosed herein.

The present invention deals with the topic of SLAM as well as in particular its application for mobile devices. Examples of such mobile devices (or even mobile equipment) are, for example, robots and/or drones and/or also vehicles moving in a semi-automated or (fully) automated manner (by land, water, or in air). Household robots, such as robotic vacuum cleaners and/or mopping robots, ground or road cleaning devices or robotic mowers, come into consideration as robots, but so do other so-called service robots, as vehicles moving in an at least partially automated manner, e.g., passenger transport vehicles or goods transport vehicles (also so-called forklifts, for example in warehouses), but also aircraft, such as so-called drones, or watercraft.

In particular, such a mobile device comprises a control or regulating unit and a drive unit for moving the mobile device so that the mobile device can be moved in the environment and, for example, along a trajectory. Moreover, a mobile device comprises, for example, one or more sensors by means of which information in the environment and/or of objects (in the environment, in particular obstacles) and/or of the mobile device itself can be sensed. Examples of such sensors are lidar sensors or other sensors for determining distances, cameras, and inertial sensors. By means of a lidar sensor, so-called point clouds can, for example, be sensed or obtained. Likewise, a so-called odometry (of the mobile device) can be taken into account, for example.

With SLAM, there are different approaches to representing maps and positions. Conventional methods for SLAM are generally based on geometrical information, which are generally represented by nodes and edges. Nodes and edges are typically components of the SLAM graph. The nodes and edges in the SLAM graph may be designed in different ways and comprise various items of information; traditionally, the nodes correspond, for example, to the pose (position and orientation) of the mobile device or particular environmental features at particular points in time, while the edges represent relative measurements between the nodes. SLAM graphs are described in more detail in, for example, Giorgio Grisetti, Rainer Kümmerle, Cyrill Stachniss, Wolfram Burgard; "A Tutorial on Graph-Based SLAM," IEEE Intelligent Transportation Systems Magazine, Vol. 2(4), pp 31-42, 2010.

A map of the environment in which the mobile device is moving may have been determined or may be determined based on such a SLAM graph. For this purpose, the map may include one or more so-called landmarks. For this purpose, so-called anchors or anchor points with position and/or orientation (pose) can be used, which are present in or linked to the map and with which information or a description (or annotations) are associated. Particular objects, such as obstacles, in the environment can, for example, thus be defined in the map and thus recognized and used for navigation. In general, not only objects but also, for example, particular areas of the environment that, for example, must not be traveled by the mobile device or that have particular ground conditions can thus be defined. In this case, a physical feature does not always have to be present in the environment since a room can, for example, be randomly divided into two areas by a user. Particular events, e.g., the collision of the mobile device with an obstacle, can likewise be defined in this way. A docking or charging station, for example, can likewise be defined in this way.

A SLAM graph is typically updated repeatedly, for example after a so-called loop closure. In the process, it may happen that nodes and/or edges in the SLAM graph are changed (updated or adjusted). In general, the maps, and thus not only the SLAM graph but also the information or description in the map, can also change, for example during updates. For example, several maps may also be fused to form a new map. In this context, reference to dynamic maps is also made.

In the event of such an update, it is expedient to also update the position and/or orientation of anchor points (or landmarks). For this purpose, according to an example embodiment of the present invention, a possibility is provided to add anchor points to a map based on a SLAM graph, wherein the anchor points are also automatically updated in the event of an update of the SLAM graph. Moreover, a description for the anchor points may be added to the map, which then in particular has been or is associated with one or more anchor points. Here, for example, in an executing system for data processing, e.g., a processor or a control unit of the mobile device, an anchor module as well as one or more map processing modules can be provided, wherein the map processing modules communicate (for data exchange) with the anchor module via an interface. These may be separate software modules running on the same control unit, but separate systems for data processing may also be used.

According to an example embodiment of the present invention, in order to now add anchor points to the map, a position and/or orientation is provided for each of the one or more anchor points to be added to the map, viz., for example, for the anchor module. For example, a request may be made to the anchor module by a map processing module that wants to add an anchor point, for which purpose the position and/or orientation is then provided or transmitted. The position and/or orientation of the anchor point can, for example, be externally specified as desired or can also be determined within the framework of particular activities of the mobile device. For example, during docking of the mobile device (e.g., robot vacuum cleaner) to a docking station that was not previously known, a corresponding map processing module may (automatically) add an anchor point for the docking station at which the position and/or orientation is determined on the basis of the position and/or orientation of the mobile device during docking.

The anchor point is then associated with a node in the SLAM graph, viz., in particular a node nearest the anchor point. For example, the nearest node may be determined by a metric, e.g., as a node having the shortest distance from the positions of anchor point and node. The anchor point, i.e., at least its position and/or orientation, is thus linked to a node present in the SLAM graph; corresponding information (about the link) can then, for example, be saved. Preferably, a relative position and/or orientation is also determined between the position and/or orientation of the anchor point and a position and/or orientation of the node (which is present or stored in the SLAM graph).

The anchor point and, where applicable, information about the relative position and/or orientation of the anchor point are then added to the map of the environment. Likewise, as mentioned, a description (annotation) of the anchor point, in particular a semantic description, may be provided, which is then added to the map of the environment. However, this description may inherently be dealt with separately from the position and/or orientation and may be used, for example, depending on the desired application. A description may also apply to several anchor points together if, for example, a particular area is defined by several anchor points.

In this way, a map with anchor points is thus obtained, in which an update of the underlying SLAM graph, i.e., for example, a change or adjustment of the position and/or orientation of nodes in the SLAM graph, automatically results in an update of the anchor points since the association of the anchor point to the node is inherently retained. On the basis of the relative position and/or orientation between the anchor point in relation to the node prior to the update, the correct position and/or orientation of the anchor point can also be deduced again after the update, then based on the new position and/or orientation of the node. It should be mentioned that an anchor point neither is nor will be a node in the SLAM graph but is basically separate from the SLAM graph, albeit linked thereto by the association with a node. It should also be noted that the relative position and/or orientation between the anchor point and node does not change so that although the anchor point may be changed somewhat, e.g., moved and/or shifted, within the entire map, it remains the same locally. This is explained in more detail below with respect to the description of the figures.

According to an example embodiment of the present invention, preferably, an identifier, in particular a unique identifier, is also determined for the anchor point and then provided. This may likewise be carried out by the anchor module, for example. Each anchor point can thus be uniquely identified. For example, several different maps may be present, but the anchor points can be distinguished across the maps. For example, in the event the maps are fused, no collisions of the anchor points thus occur. In the case of several maps, information about which map contains an anchor point can then also be provided for the anchor point.

It is also possible that a check is carried out as to whether an anchor point to be added can even be added to the map. For example, if the position of the anchor point is too far from a nearest node, the addition can be prevented. This could otherwise result in problems during the update of the SLAM graph.

Based on the SLAM graph or the map based on the SLAM graph, navigation information for the mobile device is then, in particular, also provided. This allows the mobile device to navigate or move in the environment.

According to an example embodiment of the present invention, in addition to such requests to add anchor points, for example by one or more of the mentioned map processing modules, requests to provide information about one or more particular anchor points or about all anchor points of the map may also be made. The information about the one or more particular anchor points, if present (i.e., if the requested anchor points exist at all; they can, for example, be identified via the mentioned identifier), or about all anchor points of the map can then be provided, for example by the anchor module. In this case, the information about the anchor points can include the position and/or orientation, but also the mentioned identifier and/or the description. Likewise, requests to remove one or more particular anchor points from the map may also be made, for example by one or more of the mentioned map processing modules. The relevant anchor points, if present (i.e., if the requested anchor points exist at all; they can, for example, be identified via the mentioned identifier), can then be removed, for example by the anchor module.

How the addition of an anchor point specifically takes place in a SLAM graph is briefly explained below. According to an example embodiment of the present invention, for this purpose, a SLAM graph G=(V,E) with a set of nodes V and a set of edges E may be assumed. Each node has an optimized pose (position and orientation) which may be two-dimensional (2D) or three-dimensional (3D); this may, for example, depend on the type of the application or of the mobile device. This pose may change over time if, for example, new information is added (e.g., during a loop closure).

If the addition of an anchor point with a particular pose $p_{map}$ is now requested or demanded, the node $\hat{v} \in V$ whose position is, for example, the closest to the position of $p_{map}$ is sought. The Euclidean metric may, for example, be used for this purpose so that the following applies:

$$\hat{v} = \underset{v \in V}{\operatorname{argmin}} \| p_{map} - p_v \|.$$

Then, the relative pose $p_{rel}$ of the anchor point in relation to $\hat{v}$ can be determined or calculated and, for example, saved:

$$p_{rel}=p_{map}\ominus p_{\hat{v}}.$$

If the current pose $p_{current}$ of an anchor point is requested, it can be determined by applying the saved relative pose $p_{rel}$ to the current pose of the node $\hat{v}$, which may have changed (due to updates) since the anchor point was added:

$$p_{current}=p_{\hat{v}}\oplus p_{rel}.$$

With SLAM graphs, there is the possibility of thinning them out, i.e., of removing nodes and/or edges therefrom and of thus reducing the amount of data. If, within the framework of such thinning out or for other reasons, one or more nodes are or are to be removed from the SLAM graph, it could happen that an anchor point is associated with one or more nodes to be removed. In this case, it is preferred if another node (a node remaining in the SLAM graph) is assigned to such an anchor point. Here, the nearest node can then again be used. In so doing, based on the position and/or orientation of the node to be removed and the position and/or orientation of the anchor point, a new relative position and/or orientation between the anchor point and the new, associated node can be determined.

Likewise, according to an example embodiment of the present invention, it is expedient if the removal of nodes that are associated with an anchor point is prevented. Thus, although the SLAM graph is thinned out somewhat less, an exact position for the anchor point is retained. Basically, a distinction may also be made for different anchor points as to whether an associated node may or may not be removed and whether, where applicable, a new node must then be assigned. This may, for example, be made dependent on a criterion, such as the importance of the anchor point.

A system according to the present invention for data processing, e.g., a control unit of a robot, of a drone, of a vehicle, etc., is configured, in particular in terms of program technology, to perform a method according to the present invention.

Although it is particularly advantageous to carry out the mentioned method steps in the computing or control unit in the mobile device, some or all method steps may also be performed on another computing unit or a computer, such as a server (keyword: cloud); for this purpose, a preferably wireless data or communication link between the computing units is accordingly required. There is thus a computing system for performing the method steps.

The present invention also relates to a mobile device configured to obtain navigation information as mentioned above and to navigate based on navigation information. This may, for example, be a passenger transport vehicle or goods transport vehicle, a robot, in particular a household robot, e.g., a robotic vacuum cleaner and/or mopping robot, a ground or road cleaning device or robotic mower, a drone, or even combinations thereof. Furthermore, the mobile device may comprise one or more sensors for sensing object and/or environmental information. Moreover, the mobile device may in particular comprise a control or regulating unit and a drive unit for moving the mobile device.

The implementation of a method according to the present invention in the form of a computer program or computer program product with program code for carrying out all method steps is also advantageous since this results in particularly low costs, in particular if an executing control device is also used for further tasks and is therefore present in any event. A machine-readable storage medium is also provided, on which the computer program as described above is stored. Suitable storage media or data carriers for providing the computer program are in particular magnetic, optical and electrical memories, such as hard disks, flash memory, EEPROMs, DVDs, etc. Downloading a program via computer networks (internet, intranet, etc.) is also possible. Such a download can take place in a wire, or cabled, or wireless manner (e.g., via a WLAN, a 3G, 4G, 5G, or 6G connection, etc.).

Further advantages and embodiments of the present invention emerge from the description and the figures.

The present invention is illustrated schematically in the figures on the basis of exemplary embodiments and is described below with reference to the figures.

BRIEF DESCRIPTION OF THE DRAWINGS

FIG. 3 schematically shows a sequence of a method according to the present invention in a preferred embodiment.

FIG. 5 schematically shows maps for explaining the present invention in a further, preferred embodiment.

FIG. 6 schematically shows maps for explaining the present invention in a further, preferred embodiment.

DETAILED DESCRIPTION OF EXAMPLE EMBODIMENTS

Figures 1, 2:
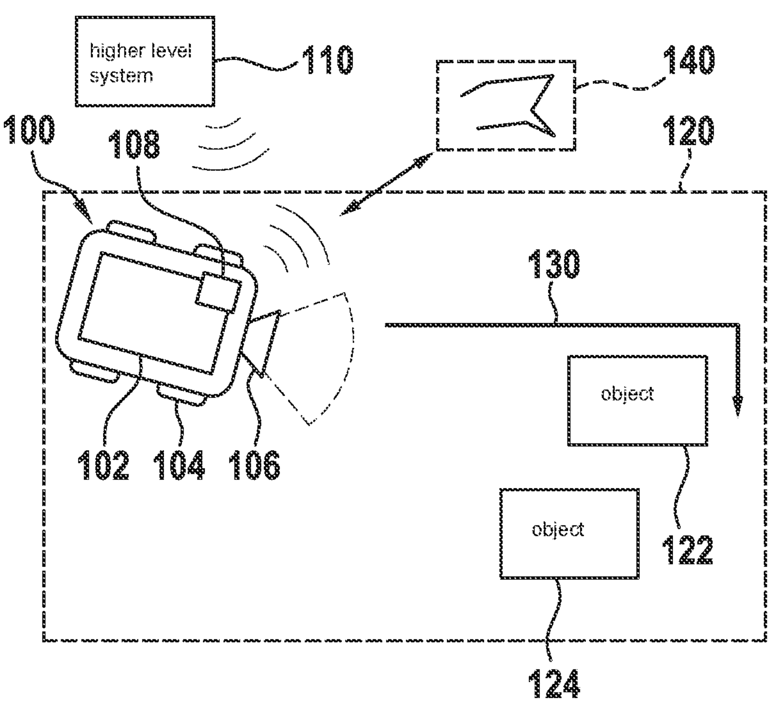
FIG. 1 schematically shows a mobile device in an environment for explaining the present invention in a preferred embodiment.
FIG. 2 schematically shows a structure of a system for explaining the present invention in a preferred embodiment.

FIG. 1 schematically and purely by way of example shows a mobile device 100 in an environment 120 for explaining the present invention. The mobile device 100 may, for example, be a robot, such as a robotic vacuum cleaner or robotic mower, with a control or regulating unit 102 and a drive unit 104 (with wheels) for moving the robot 100, e.g., along a trajectory 130. As mentioned, it may however also be another type of mobile device, e.g., a goods transport vehicle.

Furthermore, the robot 100, by way of example, comprises a sensor 106 designed as a lidar sensor with a detection field (indicated with dashes). For better illustration, the detection field is selected here to be relatively small; in practice, the detection field may however also be up to 360° (however, e.g., at least 180° or at least 270°). By means of the lidar sensor 106, object and/or environmental information, such as distances of objects, can be sensed. By way of example, two objects 122 and 124 are shown. Moreover, the robot may, for example, comprise a camera in addition to or instead of the lidar sensor.

Also schematically indicated is a map 140, which is based on a SLAM graph and which the mobile device 100 can use to navigate. The map 140 includes, for example, the objects 122, 124 as anchor points with a suitable description after they have been added.

Furthermore, the robot 100 comprises a system 108 for data processing, e.g., a control device, by means of which data can be exchanged with a higher-level system 110 for data processing via an indicated radio link, for example. In the system 110 (e.g., a server, but it may also refer to a so-called cloud), navigation information, for example comprising the trajectory 130, can be determined from, for example, the map 140 or its SLAM graphs, which navigation information is then transmitted to the system 108. In the robot 100, based on which the robot is then to navigate. However, it may likewise be provided that navigation information is determined in the system 108 itself or otherwise obtained there. Instead of navigation information, the system 108 may however also obtain, for example, control information which has been determined on the basis of the navigation information and according to which the control or regulating unit 102 can move the robot 100 via the drive unit 104 in order to, for example, follow the trajectory 130.

FIG. 2 schematically shows a structure of a system 108 for explaining the present invention in a preferred embodiment. The system 108 may, for example, be the system 108 of the robot 100 of FIG. 1, wherein in particular only the functions performed on the system 108 are shown in the form of modules (software modules).

In this case, a SLAM module 210 is initially provided, which, for example, basically performs or handles all functions relevant to SLAM, such as the creation of the SLAM graph and of the map 140 based thereon. For example, within the SLAM module 210, an anchor module 220 may be executed, which adds anchor points to the map 140 and handles further requests. Furthermore, several map processing modules are provided, one of which is denoted by 230. These map processing modules may, for example, make requests 260 to the anchor module via an interface 222 in order to, for example, add an anchor point to the map or obtain information 262 about anchor points, in particular also position and/or orientation 264.

Furthermore, by way of example, a further software module 240 not specified in more detail is provided, which can obtain descriptions 270 of, for example, anchor points from a map processing module 230 and can itself, for example, transmit requests 272 to a map processing module 230 to, for example, edit descriptions. The map 140 itself may also be provided to the software module 240.

Furthermore, a sensor module 250 is provided, which obtains sensor or environmental information 252 from, for example, the sensor 106 (cf. FIG. 1) and provides them, for example, to the SLAM module 210, the map processing modules 230, and the software module 240.

Furthermore, a user 280 is shown, which may, for example, also (manually) transmit requests to a map processing module 230 to process descriptions.

FIG. 3 schematically shows a sequence of a method according to the present invention in a preferred embodiment. By way of example, an anchor point is to be added to a map here. For this purpose, in a step 300, a position and/or orientation 302 of the anchor point 304 is provided, for example from a map processing module 230 to the anchor module 220 (cf. FIG. 2).

In a step 310, the anchor point 304 is then associated with a node 312 in a SLAM graph 314; anchor point and node are linked. In a step 320, a relative position and/or orientation 322 between the position and/or orientation 302 of the anchor point 304 and a position and/or orientation of the node 312 can be determined. In a step 330, a unique identifier (or ID) 332 can be determined for the anchor point 304.

In a step 340, the anchor point 304 is then added to the map 140. Moreover, the information about the relative position and/or orientation 322 of the anchor point as well as the identifier 332 may also be provided. In a step 350, navigation information 352 can also be determined by, for example, combining or linking, based on the map 140, the anchor point or information thereof with a description (or semantic information) 306 (e.g., likewise provided) in order to be able to control the mobile device, i.e., to navigate the mobile device.

Figure 4:
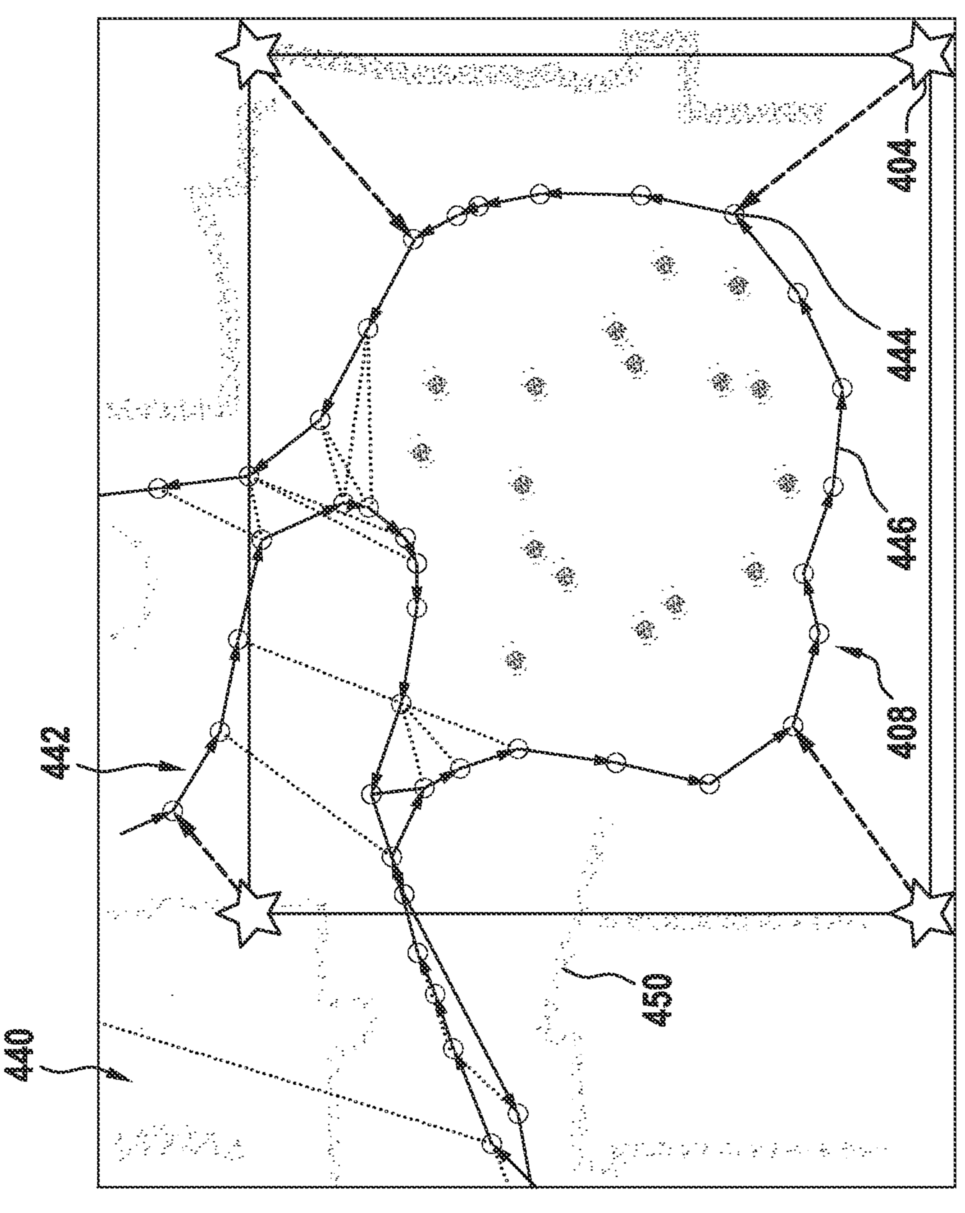
FIG. 4 schematically shows a map with a SLAM graph for explaining the present invention in a preferred embodiment.

FIG. 4 schematically shows a map 440 with a SLAM graph 442 for explaining the present invention in a preferred embodiment. As explained at the outset, a SLAM graph typically comprises a plurality of nodes and edges. By way of example, one node is denoted by 444, one edge is denoted by 446. By way of an example, 450 denotes lines and points, which represents objects or walls and are, for example, sensed by the sensor of the robot and may also be stored in the map.

As mentioned, a particular area can, for example, be specified by anchor points. By way of example, in FIG. 4, an area 408 is defined by four anchor points, which are represented as stars and of which one is denoted by 404. For example, the area 408 may be provided for the purpose of not being traveled by the robot (a so-called prohibited zone).

Now, when the anchor points are added to the map 440, a respective nearest node in the SLAM graph 442 is determined for each anchor point, as shown by dashed arrows which lead from a respective anchor point (star) to a node. For example, the anchor point 404 is associated with the node 444. In this case, the relative position between anchor point 404 and node 444 is defined, for example, by the dashed arrow.

FIG. 5 schematically shows maps for explaining the present invention in a further, preferred embodiment. For this purpose, the example of an autonomous mobile robot as a mobile device, as, for example, also shown in FIG. 1, is to be considered. For example, the robot regularly explores new parts of the environment and could be switched off and on at various locations unknown to the robot (this is referred to as so-called "kidnapped robot problem").

In order to support this scenario, a SLAM system can be used that can recall several disjoint maps from the past (i.e., the maps are inherently available), can re-locate the robot in one of the past maps, can merge several maps, and can refine and expand the contents of the past maps on the basis of the new information that the robot collects during operation.

At the same time, the map processing modules require that the position of specific static objects and descriptions (and thus anchor points) be kept up-to-date at all times. Using the anchor module enables this without the need for each map processing module to be deeply integrated in and connected to the SLAM system.

For example, a map processing module may be a docking module for battery management. The system (i.e., the robot) must, for example, be able to automatically return to its docking station in order to recharge before the batteries are empty.

In this example, a docking station is identified by a single pose corresponding to (or at least determined based on) the pose of the robot during docking to this docking station. Every time the robot is docked to a previously unknown docking station, the docking module will prompt the anchor module to create a new anchor point with the current robot pose (which is used as the pose of the anchor point). This may, for example, take place when the robot starts in a docking station for the first time or after it has successfully docked to a new docking station. For example, in order to determine whether docking was successful, it can be checked whether the battery has been recharged.

The anchor module then returns an identifier or ID in order to identify the anchor point that corresponds to the newly added docking station. The docking module then associates the ID of the anchor point to, for example, its internal data structure of the docking station; this may, for example, look as follows:

Newly added docking station: Docking station 4—anchor point ID 82

Other docking stations, already registered (i.e., already present on the map):

Docking station 1—anchor point ID 04
Docking station 2—anchor point ID 19
Docking station 3—anchor point ID 72

If necessary, the docking module can retrieve the locations of the individual docking stations in the current map by either explicitly requesting anchor data or, for example, tapping an output channel of the anchor module (if such a channel is provided).

In FIG. 5, on the left side, on the map 540, which is based on a SLAM graph, one anchor point 504 is, by way of example, present, which was added, for example, as explained above. On the right side, the map 540 is shown again, but after the SLAM graph has been updated, e.g., after a loop closure. Here, it can be seen that the right part of the map, which was previously a little skewed, is now straight (in relation to the left part of the map). The anchor point located in this right part of the map is also updated in this manner since the node of the SLAM graph with which it is associated (not shown here) has been updated. The position of the docking station on the map thus remains consistent when the map is corrected.

FIG. 6 schematically shows maps for explaining the present invention in a further, preferred embodiment. As mentioned, particular areas may, for example, be specified that must not be traveled by the robot because, for example, there are obstacles that are invisible to the sensor and could damage the robot itself or that could be damaged when traveled over. This could, for example, be a lake or a staircase leading downward, if only a 2D lidar mounted parallel to the ground is used as a sensor.

Such prohibited zones can be represented as polygons and can be defined via anchor points at the vertices of the polygons on the map. For example, a rectangular prohibited zone is represented by four anchor points (cf., e.g., FIG. 4)—one for each corner. A triangular prohibited zone can, for example, be represented by three anchor points. In FIG. 6, the left side shows a map 640 with such a prohibited zone (or generally an area) 608 defined by three anchor points (represented as stars).

Here, for example, a user can create a new prohibited zone by marking particular locations on the map of the robot. For this purpose, a corresponding map processing module requests the creation of three new anchor points from the anchor module. The anchor module returns three IDs (identifiers) in order to identify each of the newly created anchor points.

The map processing module associates these IDs with the internal prohibited zone data structure, for example:

Newly added triangle:

Prohibited zone 3, corner 1—anchor point ID 41
Prohibited zone 3, corner 2—anchor point ID 42
Prohibited zone 3, corner 3—anchor point ID 47

Other (triangular) polygons that are already registered:

Prohibited zone 1, corner 1—anchor point ID 01
Prohibited zone 1, corner 2—anchor point ID 02
Prohibited zone 1, corner 3—anchor point ID 03
Prohibited zone 1, corner 4—anchor point ID 04
Prohibited zone 2, corner 1—anchor point ID 14
Prohibited zone 2, corner 2—anchor point ID 15
Prohibited zone 2, corner 3—anchor point ID 16

From now on, the map processing module can track how the poses of these polygons change during the map update by either tapping the output channel of the anchor module or explicitly requesting or demanding the data of the anchor points.

How a triangular prohibited zone (or any other area) is retained during a map merge is shown in FIG. 6. As mentioned, the left side shows a map 640 with such a prohibited zone 608 defined by three anchor points (represented as stars). For example, a hallway indicated on the upper left side of the map 640 is initially to be closed by a door.

If this door is then opened later, for example, the robot can pass through and explore the hallway. In so doing, a further map 642 can be created, as shown on the right side of FIG. 6. The two maps 640 and 642 may then also be fused. In the process, the prohibited zone 608 is retained since it is defined by the three anchor points with unique identifiers (IDs).

What is claimed is:

1. A method for adding one or more anchor points to a map of an environment, wherein a description has been or is associated with the one or more anchor points, wherein the map is based on a SLAM graph, and wherein the map is used to navigate a mobile device in the environment, the method comprising the following steps:

for each anchor point of the one or more anchor points:
providing a position and/or orientation of the anchor point;
associating the anchor point with a node in the SLAM graph, the node being a node nearest the anchor point, wherein the associating comprises creating a link between the anchor point and the node; and
adding the anchor point to the map of the environment,
wherein prior to associating the anchor point with the node:
(i) determining whether a distance between the anchor point and the nearest node satisfies a predetermined proximity criterion; and
(ii) preventing the anchor point from being added to the map when the distance exceeds the predetermined proximity criterion.

2. The method according to claim 1, further comprising, for each of the one or more anchor points:

determining a relative position and/or orientation between the position and/or orientation of the anchor point and a position and/or orientation of the node; and
adding information about the relative position and/or orientation of the anchor point to the map of the environment.

3. The method according to claim 1, further comprising, for each of the one or more anchor points:

determining a unique identifier for the anchor point; and
providing the identifier.

4. The method according to claim 1, further comprising, for each of the one or more anchor points:

providing information about one of several maps to which the anchor point is to be added;
wherein the anchor point is added to the map according to the information.

5. The method according to claim 1, further comprising:

receiving a request to provide information about one or more particular anchor points or about all anchor points of the map; and
providing the requested information about the one or more particular anchor points, if present, or about all anchor points of the map.

6. The method according to claim 1, further comprising:
receiving a request to remove one or more particular anchor points from the map; and
removing the one or more particular anchor points from the map, if present.

7. The method according to claim 1, wherein an anchor module is provided for adding the one or more anchor points to the map of the environment, wherein at least one map processing module is provided that communicates with the anchor module via an interface, and wherein requests to add anchor points and/or other requests are made by the at least one map processing module to the anchor module and received by the anchor module.

8. The method according to claim 1, further comprising, for at least one anchor point on the map:
associating the at least one anchor point with another node in the SLAM graph based on the node with which the anchor point is previously associated with is removed from the SLAM graph or is to be removed from the SLAM graph.

9. The method according to claim 1, further comprising:
preventing a removal of nodes with which an anchor point is associated, when one or more nodes are or are to be removed from the graph.

10. The method according to claim 1, further comprising:
determining navigation information for the mobile device, based on the map, and a description for the one or more anchor points on the map.

11. A system for data processing, comprising:
a device configured to add one or more anchor points to a map of an environment, wherein a description has been or is associated with the one or more anchor points, wherein the map is based on a SLAM graph, and wherein the map is used to navigate a mobile device in the environment, the device configured to:
for each anchor point of the one or more anchor points:
providing a position and/or orientation of the anchor point;
associating the anchor point with a node in the SLAM graph, the node being a node nearest the anchor point, wherein the associating comprises creating a link between the anchor point and the node; and
adding the anchor point to the map of the environment,
wherein prior to associating the anchor point with the node:
(i) determining whether a distance between the anchor point and the nearest node satisfies a predetermined proximity criterion; and
(ii) preventing the anchor point from being added to the map when the distance exceeds the predetermined proximity criterion.

12. A mobile device comprising:
a system including a device configured to add one or more anchor points to a map of an environment, wherein a description has been or is associated with the one or more anchor points, wherein the map is based on a SLAM graph, and wherein the map is used to navigate a mobile device in the environment, the device configured to:
for each anchor point of the one or more anchor points:
providing a position and/or orientation of the anchor point;
associating the anchor point with a node in the SLAM graph, the node being a node nearest the anchor point, wherein the associating comprises creating a link between the anchor point and the node; and
adding the anchor point to the map of the environment;
determine navigation information for the mobile device, based on the map, and a description for the one or more anchor points on the map; and
navigate based on the navigation information;
wherein the system includes a control or regulating unit, and a drive unit for moving the mobile device according to the navigation information,
wherein prior to associating the anchor point with the node:
(i) determining whether a distance between the anchor point and the nearest node satisfies a predetermined proximity criterion; and
(ii) preventing the anchor point from being added to the map when the distance exceeds the predetermined proximity criterion.

13. The mobile device according to claim 12, wherein the mobile device is: i) a vehicle moving in an at least partially automated manner, the vehicle being a passenger transport vehicle or a goods transport vehicle, and/or ii) a robot including a household robot, and/or a robotic vacuum cleaner and/or mopping robot, and/or a ground or road cleaning device or robotic mower, and/or iii) a drone.

14. A non-transitory computer-readable storage medium on which is stored a computer program for adding one or more anchor points to a map of an environment, wherein a description has been or is associated with the one or more anchor points, wherein the map is based on a SLAM graph, and wherein the map is used to navigate a mobile device in the environment, the computer program comprising instructions, which, when executed by a computer, causing the computer to perform the following steps:
for each anchor point of the one or more anchor points:
providing a position and/or orientation of the anchor point;
associating the anchor point with a node in the SLAM graph, the node being a node nearest the anchor point, wherein the associating comprises creating a link between the anchor point and the node; and
adding the anchor point to the map of the environment,
wherein prior to associating the anchor point with the node:
(i) determining whether a distance between the anchor point and the nearest node satisfies a predetermined proximity criterion; and
(ii) preventing the anchor point from being added to the map when the distance exceeds the predetermined proximity criterion.

* * * * *